United States Patent [19]
Franke

[11] 3,962,622

[45] June 8, 1976

[54] HIGH-VOLTAGE GENERATOR FOR AN X-RAY DIAGNOSTIC APPARATUS

[75] Inventor: Kurt Franke, Erlangen, Germany

[73] Assignee: Siemens Aktiengesellschaft, Erlangen, Germany

[22] Filed: Apr. 24, 1975

[21] Appl. No.: 571,392

[30] Foreign Application Priority Data
May 16, 1974  Germany............................ 2423929

[52] U.S. Cl.............................. 321/8 R; 250/421; 315/143; 315/277
[51] Int. Cl.² .......................................... H05G 1/12
[58] Field of Search ........... 250/401, 421; 315/143, 315/255, 277; 321/5, 8 R; 323/48; 336/5, 12

[56] References Cited
UNITED STATES PATENTS

| | | | |
|---|---|---|---|
| 3,068,391 | 12/1962 | Kliesch............................. | 321/8 R |
| 3,530,359 | 9/1970 | Grist...................................... | 321/5 |

Primary Examiner—A. D. Pellinen
Attorney, Agent, or Firm—Haseltine, Lake & Waters

[57] ABSTRACT

A high-voltage generator for an X-ray diagnostic apparatus which is initially intended for single-phase operation and subsequently, through an addition, completed in a simple manner into a three-phase generator. The primary winding of the transformer, which is located in a first oil-filled vessel, is constructed of two winding portions whose junctions are conveyed exteriorly of the vessel so that each winding portion can be separately supplied with power, and that is provided a second oil-filled vessel in which there is located a second high-voltage transformer having a primary winding corresponding to the primary winding portions of the first high voltage-transformer, and a secondary winding corresponding to the secondary winding portions of the latter, the secondary winding being rounded at one end and has the other end thereof connected with rectifiers in a manner so as to supplement the rectifier bridge for the rectification of alternating current, and that in the second vessel the rectifier outlets and the junctions of the primary winding are conveyed outwardly of the vessel.

6 Claims, 2 Drawing Figures

HIGH-VOLTAGE GENERATOR FOR AN X-RAY DIAGNOSTIC APPARATUS

FIELD OF THE INVENTION

The present invention relates to a high-voltage generator for an X-ray diagnostic apparatus.

DISCUSSION OF THE PRIOR ART

High-voltage generators for an X-ray diagnostic apparatus are presently known, which are designed for single-phase alternating current, including an oil-filled vessel having located therein the high-voltage generators' primary winding and the secondary winding consisting of two series-connected winding portions with a connecting point which is grounded, a thereto connected high-voltage rectifier forming a rectifier bridge, and a heating filament transformer, wherein the junctions of the rectifier bridge, of the primary winding and of the heating filament transformer are conveyed outwardly of the vessel. Those types of generators are generally designated as two-pulse generators. Employed in an increasing measure in modern X-ray diagnostic technology are multi-phase or three-phase current generators which have an advantage in comparison with a two-pulse generator in that, for the same exposure, they require a substantially lower amount of electrical energy and a shorter illumination or photographing time. The three-phase generators possess, within an oil-filled vessel, a primary winding group having three primary winding portions and a secondary winding group with three secondary winding portions, and having an alternating current-rectifier group subsequently added thereto.

In the initial creation of an X-ray diagnostic installation, for a technically highly-developed generator, in effect a three-phase current generator, there are required considerable investments. Since the costs for the other components of the X-ray diagnostic installation are also quite high, it is frequently desired to at first begin with a simple X-ray generator.

SUMMARY OF THE INVENTION

Accordingly, it is an object of the present invention to provide a high-voltage generator of the type mentioned hereinabove, which is initially intended for single-phase operation and subsequently, through an addition, completed in a simple manner into a three-phase generator.

The foregoing object is inventively achieved in that the primary winding is constructed of two winding portions whose junctions are conveyed exteriorly of the vessel so that each winding portion can be separately supplied with power, and that is provided a second oil-filled vessel in which there is located a second high-voltage transformer having a primary winding leading to one of the primary winding portions of the first high-voltage-transformer, and a secondary winding leading to one of the secondary winding portions of the latter, the secondary winding being grounded at one end and has the other end thereof connected with rectifiers in a manner so as to supplement the rectifier bridge for the rectification of alternating current, and that in the second vessel the rectifier outlets and the junctions of the primary winding are conveyed outwardly of the vessel. This inventive high-voltage generator, in a simple manner, renders it possible through the utilization of a second vessel which contains a second high-voltage transformer, to so supplement a single-phase high-voltage generator which is located in the first vessel, so as to thereby create a multi-phase or three-phase generator.

In an alternative embodiment of the invention, in which the high-voltage generator for the X-ray diagnostic apparatus includes an oil filled vessel within which there are located the primary winding and secondary winding consisting of two mutually series-connected winding portions of the high-voltage transformer, a subsequently added rectifier bridge and a heating filament transformer, and whereby the junctions of the rectifier bridge, of the primary winding and of the heating filament transformer are conducted outwardly of the vessel; provision is made for in that the primary winding consists of two winding portions, that the junctions of all of the winding portions are conveyed outwardly so that each primary winding portion may be separately supplied; wherein a second oil filled vessel is provided having a second high-voltage transformer therein with a primary winding leading to one of the primary winding portions of the first high-voltage transformer, and a secondary winding leading to one to the secondary winding portions of the latter, the secondary winding having one end thereof conveyed outwardly of the vessel and being so connected with the other end to rectifiers so as to complete the rectifier bridge for the rectification of alternating current, and that in the second vessel the rectifier outlets and the junctions of the primary winding are also conducted outwardly of the vessel.

BRIEF DESCRIPTION OF THE DRAWINGS

Reference may now be had to details of the invention in the following description setting forth further advantages thereof, taken in conjunction with the accompanying drawings; in which.

DETAILED DESCRIPTION

Figure 1:
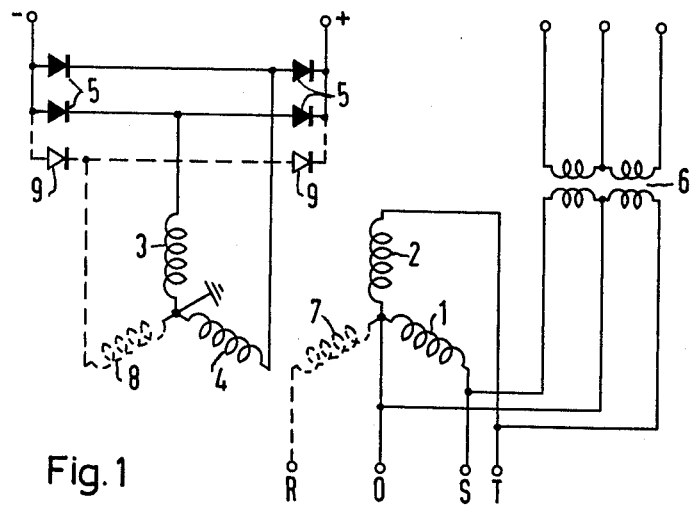
FIG. 1 shows a schematic illustration of a circuit for elucidating the principle of the present invention.

Shown in solid lines in FIG. 1 of the drawings, is a single-phase high-voltage generator for an X-ray diagnostic apparatus, which consists of two series-connected primary winding portions 1, 2, two series-connected secondary windings portions 3 and 4, and a rectifier bridge having rectifiers 5. The output voltage of the high-voltage rectifier 5 is transmitted to an X-ray tube. The generation of the filament voltage of the X-ray tube is carried out through the intermediary of a heating filament transformer 6, whose primary winding is divided into two portions so that there may be used one X-ray tube with two selectively actuatable heating filaments and, consequently, two focuses. The connecting or junction point of the second winding portions 3 and 4 is connected to ground.

From FIG. 1 there may thus be ascertained that, in a simple manner, by means of the phantom-illustrated addition of a third primary winding portion 7 and a third secondary winding portion 8, as well as two high voltage rectifiers 9, it is possible to effect completion to an alternating current or multi-phase apparatus.

The invention commences from FIG. 1 of the drawings. The invention utilizes the basic concept that the solidly-drawn individual components may be located within one oil-filled vessel, and the phantom-illustrated portions, including the rectifier 9, located within a second oil-filled vessel so that, through use of the first vessel, a single-phase operation becomes possible and that subsequently, in a simple manner, by means of the second vessel it is possible to carry out a conversion into an alternating current or three-phase generator.

Figure 2:
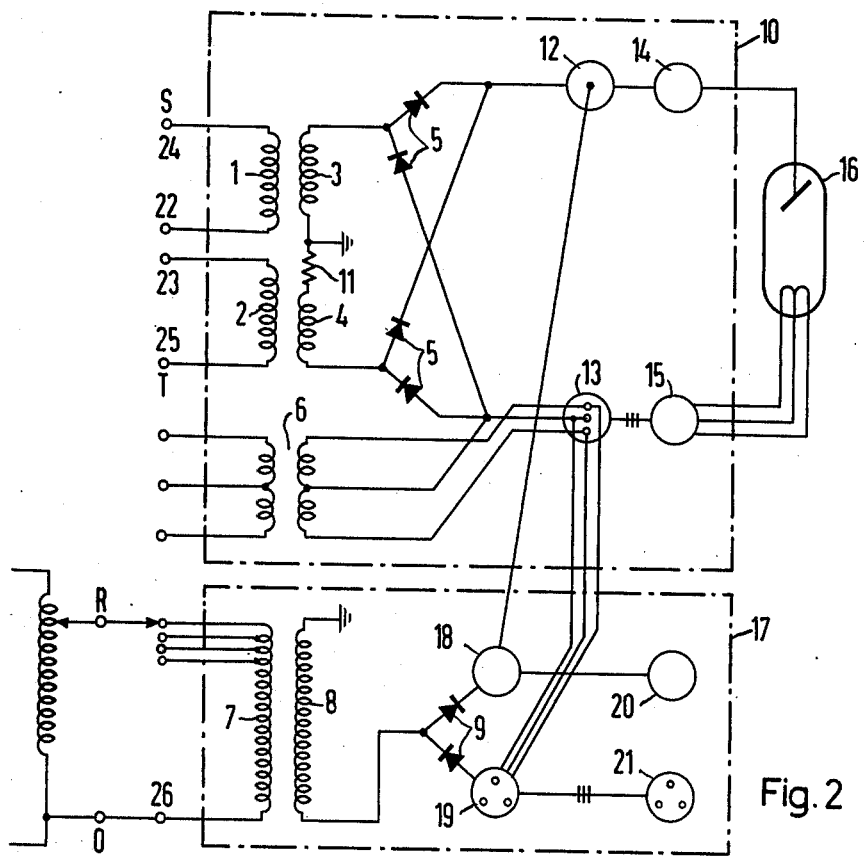
FIG. 2 schematically illustrates a high-voltage generator constructed pursuant to the present invention.

In FIG. 2 of the drawings there is illustrated a vessel 10 in which the portions 1 through 6 lie in accordance with the circuit of FIG. 1. FIG. 2 also shows a measuring resistance 11 between the two secondary winding portions 3 and 4, from which a voltage may be tapped-off which embodies the X-ray tube current. The junctions of the primary winding portions 1 and 2, as well as the outlets or terminals of the rectifier bridge 5 are conducted outwardly of the oil-filled vessel 10. Connector portions 12 and 13 thereby are connected with connector portions 14 and 15, the latter of which lead to an X-ray tube 16.

In case of need, the vessel 10 may be supplemented by a vessel 17 within which are located the components 7 through 9 pursuant to the circuit of FIG. 1. The rectifier 9 is thereby connected to connector portions 18 and 19, and which are connected with connector portions 20 and 21.

The primary winding 7 within vessel 17, in accordance with FIG. 2 of the drawings, possesses tap-offs which are led outwardly and which permit the present output voltage at the connector portions 18 and 19 to be correlated with the voltage at the connector portions 12 and 13 or, respectively, 14 and 15. For effecting the setting of the high-voltage, according to FIG. 2 there may further be provided a stepping transformer preceding the primary winding, and which may be adjustable by means of, for example, a servo-control arrangement.

The vessel 10 is employable as a single-phase high-voltage generator when the two points 22 and 23 are connected with each other, and two phases, for example, phases T and S are connected to terminals 24 and 25 in the illustrated manner. Should the vessel 10 be utilized as an alternating current generator together with the vessel 17, then, as illustrated, the connector portion 18 is connected through a high-voltage cable with the contact portion 12, and the connector portion 19 through a high-voltage cable with the common conductor at the connector portion 13. On the primary side, the terminals 22, 23 and 26 are connected with the neutral conductor of the alternating current power supply circuit, and the phase R is connected to the primary winding 7 in the illustrated manner.

A second X-ray tube may be connected to the connector portions 20 and 21 during alternating current or three-phase operation. For this purpose, the filament conductors may be led from connector portion 13 to the connector portion 19, and from there connected with the connector portion 21. The power supply of the second X-ray tube with filament voltages is then carried out through the connector portion 21.

Within the scope of the invention it is also possible that the two mutually interconnected ends of the secondary winding portions 3 and 4, and the grounded end of the second winding portion 8 be led outwardly of the vessel and exteriorly connected with each other at during multi-phase current operation. However, the herein illustrated circuit connection is simpler.

The winding portions 1 and 2 may also be connected to each other within the vessel 10, and then outwardly led with the common point.

While there has been shown what is considered to be the preferred embodiment of the invention, it will be obvious that modifications may be made which come within the scope of the disclosure of the specification.

What is claimed is:

1. In a high-voltage generator for an X-ray diagnostic apparatus including a first oil-filled vessel; a primary winding and a secondary winding formed of two series-connected winding portions with a grounded connecting point of said high-voltage transformer, high-voltage rectifiers forming a rectifier bridge; and a heating filament transformer, all being located within said vessel, the junctions for said rectifier bridge, primary winding and heating filament transformer all leading exteriorly of said vessel, the improvement comprising: said primary winding including two winding portions having the junctions thereof conducted outwardly of said vessel to facilitate separate power supply to each said winding portion; a second oil-filled vessel; a second high-voltage transformer in said second vessel having a primary winding corresponding to said primary winding portions of said first high-voltage transformer and a secondary winding corresponding to the secondary winding portions of the latter, said secondary winding having one end connected to ground; and rectifiers connected to the other end of said secondary winding for supplementing the rectifier bridge for rectification of multiphase current, the outlets of the rectifiers and the junctions of the primary winding in said second vessel being conducted exteriorly thereof.

2. A high-voltage generator as claimed in claim 1, said primary winding in said second vessel comprising tap-offs leading exteriorly of said vessel.

3. A high-voltage generator as claimed in claim 1, said second vessel comprising connector means for a second X-ray tube.

4. In a high-voltage generator for an X-ray diagnostic apparatus including a first oil-filled vessel; a primary winding and a secondary winding formed of two series-connected winding portions of said high-voltage transformer; an after-connected rectifier bridge; and a heating filament transformer, the connectors for said rectifier bridge, primary winding and heating filament transformer leading exteriorly of said vessel, the improvement comprising: said primary winding including two winding portions having the junctions thereof conducted outwardly of said vessel to facilitate separate power supply to each said winding portion; a second oil-filled vessel; a second high-voltage transformer in said second vessel having a primary winding corresponding to said primary winding portions of said first high-voltage transformer and a secondary winding corresponding to the secondary winding portions of the latter, said secondary winding having one end thereof conducted exteriorly of said vessel; and rectifiers connected to the other end of said secondary winding for supplementing the rectifier bridge for rectification of multi-phase current, the outlets of the rectifiers and the junctions of the primary winding in said second vessel being conducted exteriorly thereof.

5. A high-voltage generator as claimed in claim 4, said primary winding in said second vessel comprising tap-offs leading exteriorly of said vessel.

6. A high-voltage generator as claimed in claim 4, said second vessel comprising connector means for a second X-ray tube.

* * * * *